Feb. 5, 1957 J. F. DREYER, JR 2,780,727

RESONANT CIRCUIT

Filed March 26, 1952 2 Sheets-Sheet 1

INVENTOR.
JOHN F. DREYER, JR.
BY
Campbell, Brumbaugh, Free & Graves
HIS ATTORNEYS.

Feb. 5, 1957 J. F. DREYER, JR 2,780,727

RESONANT CIRCUIT

Filed March 26, 1952 2 Sheets-Sheet 2

INVENTOR.
JOHN F. DREYER, JR.
BY
Campbell, Brumbaugh, Free & Graves
HIS ATTORNEYS.

2,780,727
Patented Feb. 5, 1957

2,780,727

RESONANT CIRCUIT

John F. Dreyer, Jr., Northport, N. Y., assignor to Telephonics Corporation, Huntington, N. Y., a corporation of New York Application March 26, 1952, Serial No. 278,729

2 Claims. (Cl. 250—40)

The present invention relates to resonant electrical circuits and, more particularly, to shielded parallel resonant circuits wherein a variable inductor and a variable capacitor are simultaneously adjusted by a single tuning control.

In accordance with the present invention a resonant circuit is provided within a housing which serves as a shield. A cylindrical member which includes an inductive element is supported axially within a cylindrical hole or chamber in the housing. The cylindrical member at frequencies below, say 200 megacycles, comprises a tubular coil form on which a coil is wound to serve as the inductive element. At higher frequencies, in the approximate range from 200 megacycles to 1000 megacycles, the cylindrical member may comprise merely an electrically conductive stud having self-inductance.

A metallic tuning member is threaded to the cylindrical member for movement axially relative thereto upon turning. A cylindrical capacitor rotor is mechanically and electrically connected to the metallic tuning member and moves axially with reference to a capacitor stator, formed by a reduced diameter portion of the cylindrical chamber as the metallic tuning member moves relative to the inductive element. The metallic tuning member may at relatively low frequencies comprise a powdered iron slug which is moved within the coil form by a threaded rod attached to the cylindrical rotor of the capacitor. At higher frequencies, the iron slug is no longer suitable and the tuning member may merely be a threaded non-magnetic, electrically conductive rod received within the coil form. In the highest frequency range, the tuning member may be reduced to a cylindrical nut threaded on the conductive stud which forms the inductive element at these frequencies. The cylindrical surface of the nut serves as the rotor of the capacitor.

In order that the invention may be more clearly understood, it will now be described with reference to the accompanying drawings, wherein.

Figure 1:
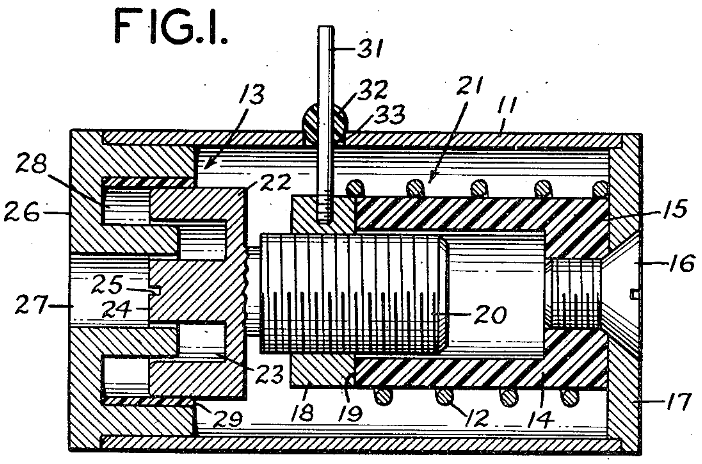
Fig. 1 is a longitudinal cross section view of the resonant circuit of the present invention.

Referring now to Fig. 1, there is shown a cylindrical metal tubular housing 11, preferably made of copper or silver-plated brass, enclosing a variable inductive element 12 connected in parallel with a variable cylindrical capacitor 13. The inductive element 12 is a helical coil which is supported on a hollow cylindrical insulating coil form 14. One end 15 of the coil form 14 is solid and is centrally bored and tapped to receive a screw 16 which secures the coil form to an end plate 17 of the housing 11. A centrally threaded metallic sleeve 18 is fixed to the open end 19 of the coil form 14 opposite the end 15 and is adapted to receive a non-magnetic, electrically conductive slug 20 in threaded engagement. The coil 12, coil form 14 and the sleeve 18 form a generally cylindrical assembly or member 21 that is supported from the end plate 17 coaxially within the housing 11.

The slug 20 is attached to a cylindrical rotor 22 of the capacitor 13. The rotor 22 has an annular groove 23 formed in the face away from the slug 20 leaving a cylindrical central portion 24 which is provided with a slot 25 for screw driver adjustment. The rotor 22 meshes with a stator 26 which takes the form of a bushing at the opposite end of the housing 11 from the end plate 17. The stator 26 is provided with a central bore 27 within which the central portion 24 of the rotor 22 is free to move without making mechanical or electrical contact. An annular groove 28 is formed in the stator 26 concentrically with the bore 27 and opposite the ring formed by the annular groove 23 in the rotor 22. The outer circumference of the groove 28 in the stator 26 is lined with an insulating sleeve 29, preferably of plastic material such as the tetrafluoroethylene polymer sold under the registered trademark "Teflon." The insulating sleeve 29 provides a bearing surface for the outer circumference of the rotor 22 and maintains the same in proper alignment with the stator 26. Teflon is excellent both as a dielectric material and as a bearing surface.

One end of the coil 12 is electrically connected to the sleeve 18 and the other end of the coil 12 is attached to the end plate 17 which is normally maintained at ground potential. The rotor 22 of the capacitor 13 is electrically connected through the slug 20 to the sleeve 18. A prong 31 attached to the sleeve 18 projects through a glass bead 32 covering an aperture 33 in the housing 11 and provides a coupling between the capacitor 13 and inductor 12 and external circuits.

It is evident that when the slug 20 is screwed in and out, the inductance of the coil 12 decreases and increases simultaneously with decrease and increase, respectively, in the capacitance of the capacitor 13. This common change provides an extended tuning range. Inasmuch as the circuit is at all times shielded, initial tuning adjustment is possible before assembly with associated apparatus without the possibility of subsequent mistuning when the complete apparatus is inserted in its outer housing. An attendant advantage is the reduction in the uncontrolled coupling between stages of amplification.

Figure 2:
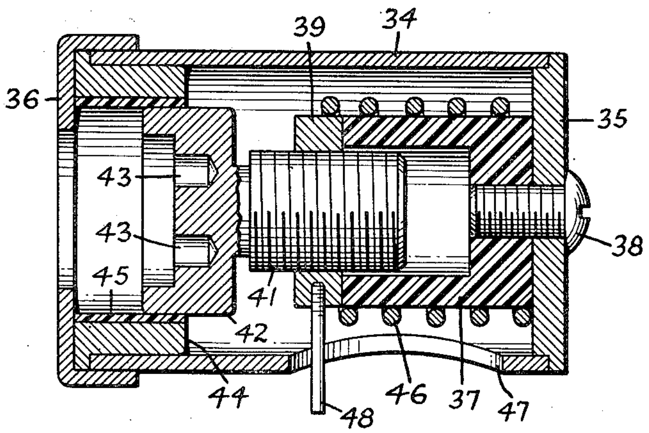
Fig. 2 is a longitudinal cross section view of a modification of the circuit shown in Fig. 1.

The apparatus shown in Fig. 2 is similar in many respects to the structure of Fig. 1. A cylindrical tubular housing 34 forms with an end plate 35 and a centrally apertured cover plate 36 a substantially enclosed shield. A hollow coil form 37 is coaxially mounted within the housing 34 by means of a screw 38 to the end plate 35 and carries a metallic sleeve 39 which is threaded to receive a non-magnetic, electrically conductive slug 41 adapted upon turning to project a greater or less extent within the coil form 37. A cylindrical capacitor rotor 42 is made integral with the slug 41 and is provided with holes 43 opposite the aperture in the cover plate 36 by which a spanner may turn the rotor 42. A cylindrical bushing 44 fits within the housing 34 adjacent the cover plate 36 and is provided with an insulating sleeve 45 on the inner surface thereof. The sleeve 45, which may be made of Teflon, makes contact with the circumference of the rotor 42 and maintains the same in alignment. The end plate 35 and the sleeve 39 are connected by a helical coil 46. A relatively large aperture 47 is provided in the side of the housing 34 to permit a prong 48 connected to the sleeve 39 to extend therethrough and to afford magnetic coupling between the coil 46 and an adjacent circuit.

Figures 3, 5:
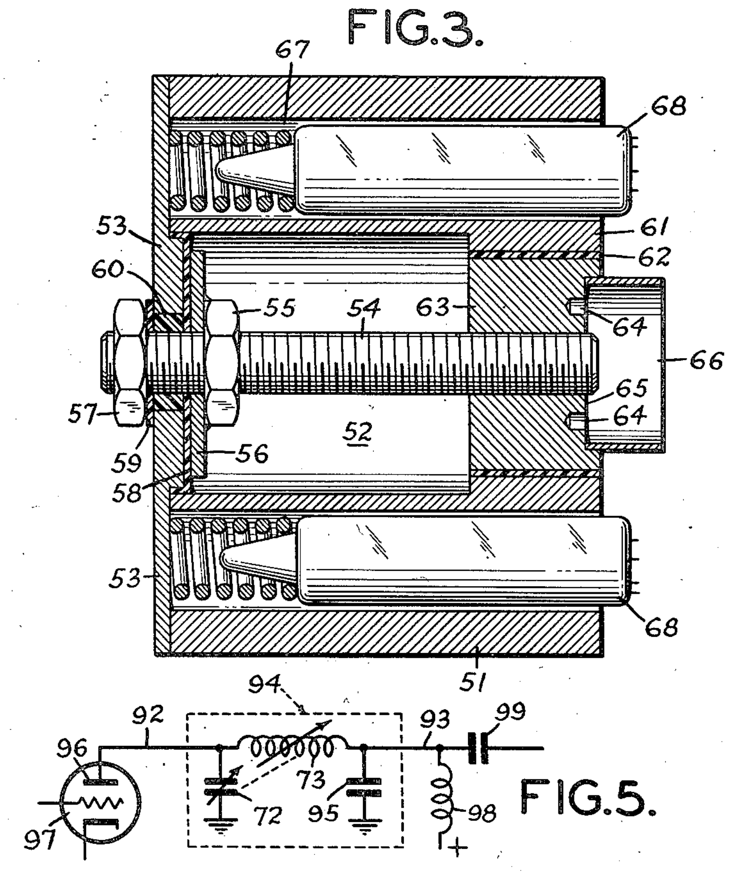
Fig. 3 is a longitudinal cross section view of a resonant circuit particularly adapted for extremely high radio frequencies.
Fig. 5 is a schematic diagram of the equivalent resonant circuit of Fig. 4 illustrating a typical application of the invention.

Fig. 3 discloses a form of invention suitable for extremely high frequencies. A housing 51 in the form of a cylindrical or rectangular block of metal, such as aluminum, is provided with a central bore 52, one end of which is closed by an end plate 53 screwed to the housing 51. A threaded, electrically conductive rod 54 projects through the end plate 53 and extends coaxially along the bore 52. The rod 54 is held in place by means of a nut 55 soldered to a metallic washer 56 on the inside of the bore 52 and a further nut 57 outside the end plate 53. In order to insulate the rod 54 from the end plate 53, insulating washers 58 and 59 are provided between the metallic washer 56 and the end plate 53 and between the nut 57 and the end plate 53, respectively. An insulating sleeve 60 is also employed between the rod 54 and the plate 53.

At the end of the housing 51 opposite the end plate 53 the diameter of the bore 52 is reduced to form a bearing surface 61 which is lined with an insulating sleeve 62. A cylindrical nut 63 is centrally threaded upon the rod 54. Spanner holes 64 are provided in the outer face 65 of the nut 63 to facilitate turning the same. A cylindrical ring 66 is inserted in a circular groove in the face 65 of the nut 63 for the purpose of providing a contacting surface to couple the nut 63 and the rod 54 to an external circuit.

One or more bores 67 are formed in the housing 51 parallel to the central bore 52 to provide a mounting for sub-miniature tubes 68. The prong on each tube connecting with the control grid thereof may be grounded to the housing 51 and the anode of each tube may be initially connected by a sliding spring finger (not shown) to the ring 66 which serves as a slip ring.

In the operation of the circuit of Fig. 3 screwing the cylindrical nut 63 inwardly reduces the capacitance between the nut and the surface 61 of the housing 51 and likewise reduces the length and accordingly the self-inductance of the rod 54. When the circuit is correctly tuned the spring finger may be soldered to the ring 66 to make a permanent electrical connection and to prevent any mechanical movement which might mistune the circuit.

Figure 4:
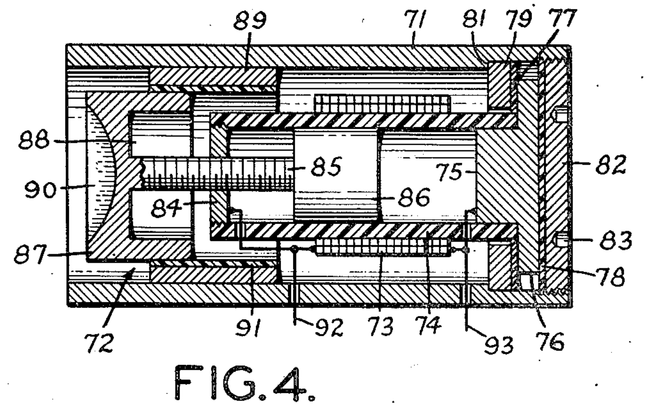
Fig. 4 is a longitudinal cross section view of a resonant circuit particularly adapted for relatively low radio frequencies.

The resonant circuit shown in Fig. 4 is primarily intended for low radio frequencies, such as 100 kilocycles. A metallic tubular housing 71 contains a cylindrical capacitor 72 and an inductor 73. The inductor 73 is a coil supported on a hollow insulating coil form 74. The form 74 fits over a cylindrical metallic plug 75 which is provided with a circular flange 76. The flange 76 is held within the housing 71 between an inner insulating ring 77 and an outer insulating disc 78. The inner insulating ring 77 is backed by a washer 79 which bears against a shoulder 81 within the housing 51. The insulating disc 78 is clamped by means of an end plug 82 threadedly engaging the housing 71 and provided with transversely spaced bore holes 83 for receiving a spanner.

The other end of the coil form 74 carries a metallic bushing 84 which is centrally bored and threaded to engage a rod 85. A powdered iron slug 86 is formed on the end of the rod 85 that extends within the coil form 74. The opposite end of the rod 85 expands into a cylindrical rotor 87 of the capacitor 72. The rotor 87 is cut away to provide an annular groove 88 around the rod 85 within which the free end of the coil form 74 may be received when the slug 86 is at its innermost position at the point of maximum inductance. The stator portion of the capacitor 72 is formed by a metallic sleeve 89 fitting against the inside of the housing 71 and partially overlapping the coil form 74. The sleeve 89 is lined with insulating material 91 to prevent electrical contact between the rotor 87 and stator 89 and is so axially positioned within the housing 71 that the capacitance of the capacitor 72 reaches its maximum value simultaneously with the attainment of maximum inductance of the inductor 73. A slot 90 is provided in the outer face of the rotor 87 to permit convenient adjustment of the same.

Conductors 92 and 93 issuing from the housing 71 are electrically connected to the two terminals of the inductor 73. The conductors 92 and 93 likewise connect with the metallic bushing 84 and the plug 75, respectively.

The electrical equivalent of the structure of Fig. 4 is shown in Fig. 5 where it is seen to comprise a Pi network 94. The capacitance between the plug 75 of Fig. 4 and the housing 71 is indicated as a capacitor 95. The housing 71 is assumed to be at ground potential. Under these conditions each terminal of the inductor 73 is coupled to ground by a capacitor. In the typical application illustrated, the conductor 92 is connected to the anode 96 of an electron tube 97. The conductor 93 is connected through a choke coil 98 to a source of positive voltage for the anode 96. The output signal appearing across the choke coil 98 is made available through a blocking capacitor 99 connected to the conductor 93.

It is to be observed that the simple construction of the above described and illustrated circuits is in considerable measure a result of permitting the stator of the cylindrical capacitor to assume the same potential as the electrically shielding housing. The stator thus becomes a portion of the shield and also serves as a structural member which reenforces the housing.

Since only a few examples of the resonant circuit have been disclosed and the circuits are susceptible of substantial alteration, the invention is to be limited only by the language of the appended claims.

I claim:

1. A resonant circuit comprising an electrically shielding housing providing a chamber, a cylindrical member supported from one end of said housing to extend axially into the chamber in cantilever fashion and including an inductive element, a metallic tuning member in the chamber having screw threads engaging with said cylindrical member to be supported thereby in axial alignment therewith, a cylindrical capacitor rotor integral with said tuning member, a tubular capacitor stator forming a portion of said housing at the opposite end from that which supports the cylindrical member, an insulating sleeve lining the inner surface of the tubular capacitor stator, said sleeve having an inner cylindrical surface within which said cylindrical capacitor rotor is slidably and rotatably received, and means for turning said tuning member and capacitor rotor to change the inductance of said inductive element and the capacitance of said capacitor by shifting them axially relative to said cylindrical member.

2. A resonant circuit comprising an electrically shielding housing providing a chamber, a cylindrical member supported from one of said housing and extending axially in cantilever fashion into the chamber, said member including a sleeve of insulating material and an inductive coil wound thereon, an internally threaded metallic sleeve fixedly mounted adjacent the inner end of said insulating sleeve coaxially therewith, a metallic tuning member including a cylindrical capacitor rotor and, integrally therewith, a non-magnetic electrically conductive slug threaded into said metallic sleeve to enter the insulating sleeve, a tubular capacitor stator forming a portion of said housing at the opposite end from that which supports said member, said inductive coil being electrically connected at one end to the metallic sleeve, an electrical terminal joined to said metallic sleeve and passing through the cylindrical housing, said terminal being insulated electrically from the housing, and means for turning said tuning member, whereby the threaded connection between the metallic sleeve and the slug shifts the tuning member axially to change the inductance of said inductive element and the capacitance of said capacitor in the same sense.

(References on following page)

References Cited in the file of this patent

UNITED STATES PATENTS

| | | |
|---|---|---|
| 1,807,300 | Benjamin | May 26, 1931 |
| 1,878,636 | Koepping | Sept. 20, 1932 |
| 2,147,425 | Bock | Feb. 14, 1939 |
| 2,199,669 | Loughlin | May 7, 1940 |
| 2,250,366 | Frisbee | July 22, 1941 |
| 2,338,134 | Sands et al. | Jan. 4, 1944 |
| 2,414,280 | Thomas | Jan. 14, 1947 |
| 2,502,202 | Burroughes | Mar. 28, 1950 |
| 2,557,969 | Isely | June 26, 1951 |
| 2,632,109 | Chelgren | Mar. 17, 1953 |